(12) United States Patent
Brignac et al.

(10) Patent No.: US 7,988,848 B2
(45) Date of Patent: Aug. 2, 2011

(54) ACTIVATING HYDROPROCESSING CATALYSTS USING CARBON MONOXIDE AND USE OF CATALYSTS FOR HYDROPROCESSING

(75) Inventors: Garland B. Brignac, Clinton, LA (US); Andrew C. Moreland, Baton Rouge, LA (US); Thomas R. Halbert, Baton Rouge, LA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 850 days.

(21) Appl. No.: 11/386,603

(22) Filed: Mar. 22, 2006

(65) Prior Publication Data

US 2006/0231464 A1  Oct. 19, 2006

Related U.S. Application Data (60) Provisional application No. 60/672,140, filed on Apr. 15, 2005.

(51) Int. Cl.
| | |
|---|---|
| C10G 45/04 | (2006.01) |
| C10G 45/34 | (2006.01) |
| C10G 45/46 | (2006.01) |
| C10G 45/60 | (2006.01) |
| C10G 47/06 | (2006.01) |
| B01J 27/049 | (2006.01) |
| B01J 37/20 | (2006.01) |

(52) U.S. Cl. ........ 208/143; 208/112; 208/134; 208/213; 208/215; 208/251 H; 208/254 H; 502/216; 502/221; 502/313

(58) Field of Classification Search ................... 208/101, 208/142, 209, 251 H, 254 H, 143, 213, 215, 208/216 R, 217, 112, 134; 502/216, 219, 502/220, 221, 325, 305, 313; 585/906
See application file for complete search history.

(56) References Cited

U.S. PATENT DOCUMENTS

| | | | | |
|---|---|---|---|---|
| 2,967,204 A | * | 1/1961 | Beuther et al. | 585/270 |
| 3,706,693 A | * | 12/1972 | Mickelson et al. | 502/211 |
| 4,176,087 A | * | 11/1979 | Dew et al. | 502/244 |
| 4,256,653 A | | 3/1981 | Atkinson | |
| 4,348,270 A | | 9/1982 | Bearden et al. | |
| 5,059,731 A | | 10/1991 | Berrebi | |
| 6,316,382 B1 | * | 11/2001 | Kasztelan | 502/216 |
| 6,432,867 B1 | * | 8/2002 | Kasztelan | 502/216 |
| 2003/0220186 A1 | | 11/2003 | Brignac et al. | |

FOREIGN PATENT DOCUMENTS

| | | |
|---|---|---|
| EP | 0 004 408 A2 | 3/1979 |
| WO | WO 2005/035691 A1 | 4/2005 |

* cited by examiner

*Primary Examiner* — Walter D Griffin
*Assistant Examiner* — Renee Robinson
(74) *Attorney, Agent, or Firm* — David M. Weisberg; Bruce M Bordelon (57) ABSTRACT

This invention relates to a process for activating a hydroprocessing catalyst and the use of activated catalyst for hydroprocessing. More particularly, hydroprocessing catalysts are activated in the presence of carbon monoxide. The catalysts that have been activated by CO treatment have improved activity.

33 Claims, 6 Drawing Sheets

ACTIVATING HYDROPROCESSING CATALYSTS USING CARBON MONOXIDE AND USE OF CATALYSTS FOR HYDROPROCESSING

CROSS REFERENCE TO RELATED APPLICATION

This application claims benefit of U.S. Provisional Patent Application Ser. No. 60/672,140 filed Apr. 15, 2005.

FIELD OF THE INVENTION

This invention relates to a process for activating a hydroprocessing catalyst. More particularly, hydroprocessing catalysts are activated in the presence of carbon monoxide. The catalysts are used for hydroprocessing feedstocks.

BACKGROUND OF THE INVENTION

In general, hydroprocessing involves the treatment of a feed with hydrogen. The objectives of hydroprocessing vary widely and are a function of the nature of the feed and the process conditions. An important process condition is choice of the hydroprocessing catalyst as nearly all hydroprocessing reactions are catalytic in nature. The typical hydroprocessing reaction involves contacting the feed with a hydroprocessing catalyst at elevated temperature and pressure.

An example of a hydroprocessing reaction is hydrotreating. Hydrotreating itself can have different results/objectives such as hydrodesulfurization (HDS), hydrodenitrogenation (HDN) and hydrodearomatization. In a typical hydrotreating process, a petroleum feedstock that contains an unacceptable level or sulfur and/or nitrogen contaminants is contacted with hydrogen and a hydrotreating catalyst at elevated temperature and pressure. The hydrotreating catalyst may vary according to whether the objective is HDS or HDN and process conditions of temperature and pressure may also change. These catalysts may also possess hydrogenation activity for the saturation of unsaturated hydrocarbons. This latter property may be desirable or undesirable depending on the desired use. It would be highly desirable to have a catalyst activation procedure in which catalyst activity could be increased over conventional activation processes, i.e., those activation processes currently known and practiced by those skilled in the art of hydroprocessing. In the general case, hydrotreating catalysts are activated by converting metal (oxides) present on a catalyst base to a metal sulfide form. Whether these catalysts are freshly made or regenerated, the activation step is an aid in achieving good initial activity and stable activity maintenance (low deactivation rate).

The conventional activation procedure for sulfided catalysts involves heating the (oxidic) catalyst in the presence of a sulfur containing compound, which converts to $H_2S$ during the heatup, and the $H_2S$ so produced reacts with metal oxides on the catalyst support, resulting in conversion to the active state, metal sulfides. Most often, hydrogen is also present during catalyst activation. The catalyst may be activated while "on oil".

SUMMARY OF THE INVENTION

This invention relates to a hydroprocessing process which comprises: contacting a feedstock with a hydroprocessing catalyst under hydroprocessing conditions wherein said hydroprocessing catalyst is a metal-containing hydroprocessing catalyst that has been activated by treating a fresh metal-containing hydroprocessing catalyst or a regenerated metal-containing hydroprocessing catalyst with carbon monoxide under catalyst activation conditions.

Yet another embodiment relates to a hydroprocessing process which comprises: contacting a feedstock with a hydroprocessing catalyst under hydroprocessing conditions wherein said hydroprocessing catalyst is a metal-containing hydroprocessing catalyst that has been activated by treating a fresh metal-containing hydroprocessing catalyst or a regenerated metal-containing hydroprocessing catalyst with carbon monoxide in the presence of hydrogen and a sulfiding agent under catalyst activation conditions.

A further embodiment relates to a hydroprocessing process which comprises: contacting a feedstock with a hydroprocessing catalyst under hydroprocessing conditions wherein said hydroprocessing catalyst is a metal-containing hydroprocessing catalyst that has been activated by (a) treating a fresh metal-containing hydroprocessing catalyst or a regenerated metal-containing hydroprocessing catalyst with a carbon monoxide precursor, and (b) contacting carbon monoxide precursor treated catalyst from step (a) with hydrogen and a sulfiding agent under catalyst activation conditions.

DETAILED DESCRIPTION OF THE INVENTION

This invention relates to a process for activating a hydroprocessing catalyst, the activated catalyst and use of activated catalysts for hydroprocessing reactions. The hydroprocessing catalysts that are activated by carbon monoxide (CO) treatment according to the invention are those which contain metal. Hydroprocessing catalysts generally involve a carrier such as a refractory inorganic oxide having deposited thereon a metal, particularly a hydrogenation metal. In a fresh or regenerated catalyst, the metal may be in the form of metal oxide, metal salt or metal complex. The specific metals, carriers and process conditions are a function of the end use of the hydroprocessing catalyst. Such metals are preferably sulfided since sulfiding normally results in and/or increases catalytic activity. However, not all metal-containing hydroprocessing catalysts are sulfided prior to use. The CO treatment may be initiated before the introduction of the sulfiding agent, introduced at the same time as the sulfiding agent or introduced after partial sulfiding. Metals used in hydroprocessing catalysts are from Groups 3-14 of the Periodic Table based on the IUPAC format having Groups 1-18. Preferred metals are from Groups 3-10, especially Groups 6 and 8-10. Especially preferred metals are Mo, W, Ni, Co, and Ru. The catalysts may also be doped (promoted) with a variety of dopants such as Y, P Ce, Re, Zr, Hf, U and alkali metals such as Na and K. Metal catalysts may be supported. The support or carrier materials are usually inorganic oxides such as silica, alumina, silica-aluminas, magnesia, titania, zirconia, thoria, transition metal oxides, binary combinations of silicas with other metal oxides such as titania, magnesia, thoria, zirconia and the like and tertiary combinations of these oxides such as silica-alumina-thoria and silica-alumina magnesia. The process of treating a hydroprocessing catalyst with CO to enhance catalyst activity is surprising since it is known that CO in low concentrations inhibits HDS activity. United States Patent Application Publication No. 20030220186 points out that a protective agent that protects and preserves the heteroatom removal activity of the catalyst, e.g., CO, in combination with a selective deactivating agent that reduces the hydrogenation activity of the catalyst, selectively suppresses the hydrogenation activity of the catalyst having both hydrogenation and sulfur removal properties. The protective agent both protects the sulfur removal activity and also inhibits this activity. The inhibition property is removed by discontinuing the protective agent or reducing it to a concentration too low to be effective in suppressing the heteroatom removal activity. This invention is based in part on the discovery that treating a metal-containing hydroprocessing catalyst with CO during activation results in an activated catalyst with higher activity than a catalyst activated using conventional procedures, after the CO is partially or totally removed. This treatment does not require any other additives. Thus the catalyst activity may be enhanced beyond that of the fresh or regenerated catalyst activated using procedures known in the art. The catalyst to be activated by CO treatment may be fresh catalyst, regenerated catalyst or a mixture thereof. The term "regenerated" encompasses both regenerated and rejuvenated catalysts. Regenerated catalysts are those which are heated in the presence of oxygen to at least partially restore the original catalyst activity. Rejuvenated catalysts are those which are regenerated and further treated to restore additional catalyst activity. Fresh catalyst may be pre-sulfurized, i.e., treated with a compound or compounds which generate $H_2S$ during activation. Examples of such compounds are sulfur, sulfides including polysulfides, mercaptans, thiocarboxylic acids and esters thereof. CO treatment involves treating the catalyst with CO under activating conditions. The CO may be generated either by adding CO or CO-containing gas directly or by adding a CO precursor which generates CO under activating conditions. By CO generating precursor is meant a compound which releases CO under catalyst activation conditions. Examples of such CO generating precursors include carbon dioxide, carboxylic acids, carbonates, formaldehyde, glyoxal, and carbonyls such as carbon oxysulfide. The CO precursor treatment may precede catalyst sulfiding, or CO precursor/treatment may occur concurrently with catalyst sulfiding.

Activation conditions involve treating the catalyst-containing metal in the presence of CO at CO concentrations of from about 10 to 100,000 vppm based on total volume (at standard temperature and pressure, STP) of gases present, and hydrogen plus hydrogen sulfide at concentrations of from about 10 to 99.999 vol. % based on total volume of gases present, provided that hydrogen sulfide is present in an amount sufficient to convert metal oxide, metal salt or metal complex to the corresponding sulfide form. The hydrogen sulfide may be generated by a sulfiding agent. The amount of hydrogen sulfide may, for example, range from about 1000 vppm to 10 vol. % based on the total volume of gases present. Lesser amounts of hydrogen sulfide may be used but this may extend the time required for activation. An inert carrier may be present and activation may take place in either the liquid or gas phase. Examples of inert carrier gases include nitrogen and light hydrocarbons such as methane. When present, the inert gases are included as part of the total gas volume. Total pressure is in the range up to about 5000 psig (34576 kPa), preferably about 0 psig to about 5000 psig (101 to 34576 kPa), more preferably about 50 to about 2500 psig (446 to 17338 kPa). If a liquid carrier is present, the liquid hourly space velocity (LHSV) is from about 0.1 to about 10 $hr^{-1}$, preferably about 0.1 to about 5 $hr^{-1}$. The LHSV pertains to continuous mode. However, activation may also be done in batch mode. Temperatures for activation are from about 149 to about 427° C. (300 to 800° F.), preferably about 204 to about 371° C. (400 to 700° F.). The temperature may be held constant or may be ramped up by starting at a lower temperature and increasing the temperature during activation. Total gas rates may be from about 0.178 to about 17800 $m^3/m^3$ (1 to 100,000 scf/B catalyst at STP). CO must be present during at least part of the activation process but need not be present during all phases of the activation process.

Catalyst sulfiding may occur either in situ or ex situ. Sulfiding may occur by contacting the catalyst with a sulfiding agent, and can take place with either a liquid or gas phase sulfiding agent. Alternatively, the catalyst may be presulfurized such that $H_2S$ may be generated during sulfiding. In a liquid phase sulfiding agent, the catalyst to be sulfided is contacted with a carrier liquid containing sulfiding agent. The sulfiding agent may be added to the carrier liquid or the carrier liquid itself may be sulfiding agent. The carrier liquid is preferably a virgin hydrocarbon stream and may be the feedstock to be contacted with the hydroprocessing catalyst but may be any hydrocarbon stream such as a distillate derived from mineral (petroleum) or synthetic sources. If a sulfiding agent is added to the carrier liquid, the sulfiding agent itself may be a gas or liquid capable of generating hydrogen sulfide under activation conditions. Examples include hydrogen sulfide, carbonyl sulfide, carbon disulfide, sulfides such as dimethyl sulfide, disulfides such as dimethyl disulfide, and polysulfides such as di-t-nonylpolysulfide. The sulfides present in certain feeds, e.g., petroleum feeds, may act as sulfiding agent and include a wide variety of sulfur-containing species capable of generating hydrogen sulfide, including aliphatic, aromatic and heterocyclic compounds. In a gas phase CO activation process, activation with CO, $H_2S$ and/or $H_2$ may occur without any hydrocarbon being present.

In a preferred embodiment, the catalyst to be CO-treated is first loaded into a reactor. The catalyst is heated in the presence of a treat gas containing hydrogen, and with a feedstock containing sulfiding agent and heated to an initial temperature in the range of about 204° C. (400° F.). The heated catalyst/feedstock mixture is then activated with treat gas containing hydrogen and CO and the temperature incrementally raised. At the end of the activation treatment, CO flow would be curtailed or halted. The activated catalyst is useful for hydroprocessing.

The term hydroprocessing encompasses all processes in which a hydrocarbon feed is reacted with hydrogen at elevated temperature and elevated pressure (hydroprocessing reaction conditions), preferably in the presence of a treat gas and a catalytically effective amount of a hydroprocessing catalyst. The term hydroprocessing encompasses hydrogenation, hydrotreating, hydrodesulfurization, hydrodenitrogenation, hydrodemetallization, hydrofinishing, hydrodearomatization, hydroisomerization, hydrodewaxing, hydrocracking, and hydrocracking under mild pressure conditions, which is commonly referred to as mild hydrocracking. Hydroprocessing reactions are concerned with one or more objectives including heteroatom removal (S, N, O and metals), hydrogenation to increase H:C ratio (reducing aromatic and other unsaturates) and cracking C—C bonds (to reduce average molecular weights and boiling points). Hydroprocessing conditions include temperatures from about 120 to about 538° C., pressures from about 446 to about 34576 kPa (50 to 5000 psig), liquid hourly space velocities of from about 0.1 to about 20 hr$^{-1}$, and hydrogen-containing treat gas rates from about 17.8 to about 1780 m$^3$/m$^3$ (100 to 10,000 scf/B). The hydrogen-containing treat gas may contain hydrogen preferably in an amount of about 50 vol. % or more.

Feedstocks for hydroprocessing encompass a full range of feeds from light paraffins and virgin naphthas to whole crudes and include both natural and synthetic feeds. Also encompassed as feeds are organic compounds bearing functional groups that can be reduced. Boiling points for feeds may range from 15° C. to greater than 650° C. Examples of such feeds include $C_5$+ paraffins, naphthas, kerosene, gasoline, heating oils, jet fuels, diesel, cycle oils, catalytically cracked light and heavy gas oils, hydrotreated gas oil, light flash distillate, vacuum gas oil, light gas oil, straight run gas oil, coker gas oil, synthetic gas oil, deasphalted oils, foots oil, slack waxes, waxes obtained from a Fischer-Tropsch synthesis process, long and short residues, and syncrudes, optionally originating from tar sand, shale oils, residue upgrading processes, biomass, and organic compounds containing functional groups that can be reduced (hydrogenated) such as aldehydes, ketones, esters, amides and carboxylic acids. Feedstocks may have a variety of contaminants including heteroatoms such as S, N and O as well as metal contaminants such as V, As, Pb, Na, K, Ca, Ni, Fe and Cu.

A preferred hydroprocessing process is hydrotreating. Hydrotreating encompasses hydrodesulfurization (HDS), hydrodenitrogenation (HDN) and hydrodearomatization (HDA). Hydrotreating can also remove oxygenates. An aspect of hydrodearomatization includes hydrofinishing. Hydrotreating catalysts typically include at least one metal from Groups 6, 8, 9 and 10 of the Periodic Table based on the IUPAC format having Groups 1-18. Preferred metals include Co, Mo, Ni, W, and Ru. Because hydrotreating catalysts are more active in their metal sulfide form, they are normally sulfided before use. In the case of HDS and HDN, preferred catalysts contain Co, Mo, Ni, W, and mixtures thereof, more preferably Co/Mo, Ni/Mo, and Ni/W, especially Co/Mo. These catalysts are usually supported on a refractory inorganic oxide support such as alumina, silica, silica-alumina and the like. HDS and HDN catalysts may also be bulk metal catalysts containing at least one Group 6 and/or Group 8-10 metal. Preferred bulk metal catalysts are comprised of at least one Group 8-10 non-noble metal and at least two Group 6 metals and wherein the ratio of Group 6 metal to Group 8-10 non-noble metal is from about 10:1 to about 1:10, and have (in their oxide form) the formula $(X)_b(Mo)_c(W)_dO_z$, wherein X is one or more Group 8-10 non-noble metals, and the molar ratio of b: (c+d) is about 0.5/1 to 3/1. Such catalysts are described in U.S. Pat. No. 6,783,663 which is incorporated herein by reference in its entirety. HDS and HDN process conditions include temperatures in the range of about 120° C. to about 538° C. (248 to 1000° F.), pressures in the range of about 446 to about 34576 kPa (50 to 5000 psig), hydrogen treat gas rate in the range of about 17.8 to about 1780 m$^3$/m$^3$ (100 to 10,000 scf/B), and a liquid hourly space velocity in the range of about 0.1 to about 10 hr$^{-1}$. Selective HDN of heterocyclic aromatic compounds containing unsaturated nitrogen-containing rings may use catalysts containing Groups 8-9 noble metals and reaction modifiers.

Hydrodearomatization may use the same catalysts and conditions as are used for HDS and HDN as described above since some HDA will usually accompany HDS and HDN. Specifically targeted HDA may occur in conjunction with deep HDS since the aromatic compounds that may be desirable to remove from feedstocks are aromatic sulfur containing compounds such as thiophenes and benzothiophenes. Supports for the HDA catalyst may be amorphous or crystalline. Amorphous supports include alumina, silica-alumina, silica and zirconia. Crystalline supports include zeolites such as beta, USY, mordenite, MCM-41 and ZSM-48, and SAPOs, ALPOs and MEAPOs. HDA process conditions include temperatures from about 149° C. to about 538° C. (300 to 1000° F.), pressures in the range of about 446 to about 34576 kPa (50 to 5000 psig), hydrogen treat gas rate in the range of about 17.8 to 1780 m$^3$/m$^3$ (100 to 10,000 scf/B), and a liquid hourly space velocity in the range of about 0.1 to about 10 hr$^{-1}$.

Hydrofinishing is a subset of hydrodearomatization but may use different catalysts and conditions. Hydrofinishing catalysts are those containing Group 6 metals, Groups 8-10 metals, and mixtures thereof. Preferred metals include at least one metal sulfide having a strong hydrogenation function. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The metal content of the catalyst is often as high as about 20 weight percent for non-noble metals. A preferred hydrofinishing catalyst is a crystalline material belonging to the M41S class or family of catalysts. The M41S family of catalysts is mesoporous material having high silica contents whose preparation is further described in the *J. Amer. Chem. Soc.*, 1992, 114, 10834. Examples included MCM-41, MCM-48 and MCM-50. Mesoporous refers to catalysts having pore sizes from about 15 to about 100 Å. A preferred member of this class is MCM-41 whose preparation is described in U.S. Pat. No. 5,098,684. MCM-41 is an inorganic, porous, non-layered phase having a hexagonal arrangement of uniformly-sized pores. The physical structure of MCM-41 is like a bundle of straws wherein the opening of the straws (the cell diameter of the pores) ranges from about 15 to about 100 Å. MCM-48 has a cubic symmetry and is described for example is U.S. Pat. No. 5,198,203 whereas MCM-50 has a lamellar structure. MCM-41 can be made with different size pore openings in the mesoporous range. The mesoporous materials may bear a metal hydrogenation component, which is at least one of Group 8, Group 9 or Group 10 metals. Hydrofinishing conditions include temperatures from about 150 to about 350° C., preferably 180 to 250° C., total pressures from about 2859 to about 20,786 kPa (about 400 to 3000 psig), liquid hourly space velocity from about 0.1 to about 5 LHSV (hr$^{-1}$), preferably about 0.5 to about 3 hr and hydrogen treat gas rates from about 44.5 to 1780 m$^3$/m$^3$ (250 to 10,000 scf/B).

Hydrodemetallation involves removing metals such as Fe, V, As and Ca that may act as poisons on downstream catalysts. The catalysts used for hydrodemetallization are those that are used for HDS and HDN and include Ni, Co, Mo, W and combinations thereof such as Ni/Mo or Co/Mo. It is usually advantageous to use catalysts having lower hydrogenation activity and also to use large pore size catalysts, i.e., catalyst having pore sizes greater than 60 Å. The catalytic properties of such large pore catalysts are not optimal for heteroatom removal by HDS or HDN. The hydrodemetallation catalysts may be used in a guard bed prior to HDS or HDN. Hydrodemetallation conditions include temperatures from about 250 to about 500° C., preferably about 315 to about 425° C., total pressures in the range of about 3458 to 34576 kPa (500 to 5000 psig), preferably from about 8375 to about 20,786 kPa (1200 to 3000 psig), and space velocities ranging from about 0.1 to about 10.0 hr$^{-1}$, preferably from about 0.3 to about 5.0 hr$^{-1}$.

Hydrodewaxing of hydrocarbons concerns the removal of waxy components of hydrocarbon feedstocks using dewaxing catalysts. Hydrodewaxed feedstocks typically have improved properties including at least one of VI, viscosity, pour point and cloud point. Hydrodewaxing may occur by hydroisomerizing or by hydrocracking waxy components, although no dewaxing catalyst operates by one mechanism to the exclusion of the other. Hydroisomerization of waxy components isomerizes the waxes to more highly branched molecules whereas hydrocracking cracks waxy molecules to smaller (lower molecular weight) molecules. The dewaxing catalyst may be either crystalline or amorphous. Crystalline materials are molecular sieves that contain at least one 10 or 12-ring channel and may be based on aluminosilicates (zeolites), or may be based on aluminophosphates. Zeolites may contain at least one 10 or 12-ring channel. Examples of such zeolites include ZSM-5, ZSM-11, ZSM-22, ZSM-23, ZSM-35, ZSM-48, ZSM-57, ferrierite, EU-1, NU-87, ITQ-13 and MCM-71. Examples of aluminophosphates containing at least one 10-ring channel include SAPO-11 and SAPO-41. Examples of molecular sieves containing 12-ring channels include zeolite beta, ZSM-12, MCM-68 SAPO-5, SAPO-31, MAPO-36, ZSM-18, mordenite, faujasite and offretite. It should be noted that a dewaxing catalyst such as ZSM-5 can have altered dewaxing properties by adjusting catalyst properties, such as acidity, metal dispersion and catalyst particle size as noted in U.S. Pat. No. 6,294,077. The molecular sieves are described in U.S. Pat. Nos. 5,246,566; 5,282,958; 4,975,177; 4,397,827; 4,585,747; 5,075,269 and 4,440,871. MCM-68 is described in U.S. Pat. No. 6,310,265. MCM-71 and ITQ-13 are described in PCT published applications WO 0242207 and WO 0078677. Preferred isomerizing catalysts include ZSM-48, ZSM-22 and ZSM-23. Especially preferred is ZSM-48. As used herein, ZSM-48 includes EU-2, EU-11 and ZBM-30 which are structurally equivalent to ZSM-48. The molecular sieves are preferably in the hydrogen form. Reduction can occur in situ during the dewaxing step itself or can occur ex situ in another vessel.

Amorphous dewaxing catalysts include alumina, fluorided alumina, silica-alumina, fluorided silica-alumina and silica-alumina doped with Group 3 metals. Such catalysts are described for example in U.S. Pat. Nos. 4,900,707 and 6,383,366.

The dewaxing catalysts are bifunctional, i.e., they are loaded with a metal hydrogenation component, which is at least one Group 6 metal, at least one Group 8-10 metal, or mixtures thereof. Preferred metals are Groups 9-10 metals. These metals are loaded at the rate of about 0.1 to 30 wt. %, based on catalyst. Catalyst preparation and metal loading methods are described for example in U.S. Pat. No. 6,294,077, and include, for example, ion exchange and impregnation using decomposable metal salts. Metal dispersion techniques and catalyst particle size control are described in U.S. Pat. No. 5,282,958. Catalysts with small particle size and well-dispersed metal are preferred. The molecular sieves are typically composited with binder materials that are resistant to high temperatures and may be employed under dewaxing conditions to form a finished dewaxing catalyst or may be binderless (self-bound). The binder materials are usually inorganic oxides such as silica, alumina, silica-aluminas, binary combinations of silicas with other metal oxides such as titania, magnesia, thoria, zirconia and the like and tertiary combinations of these oxides such as silica-alumina-thoria and silica-alumina magnesia. The amount of molecular sieve in the finished dewaxing catalyst is from about 10 to 100 wt. %, preferably about 35 to 100 wt. %, based on catalyst. Such catalysts are formed by methods such spray drying, extrusion and the like. The dewaxing catalyst may be used in the sulfided or unsulfided form, and is preferably in the sulfided form. Dewaxing catalysts have Constraint Indices between 2 and 12. Reference is made to U.S. Pat. No. 4,784,745, which is incorporated by reference for a definition of Constraint Index and a description of how this value is measured.

Dewaxing conditions include temperatures from about 200 to about 500° C., preferably about 250 to 350° C., pressures from about 790 to about 20786 kPa (100 to 3000 psig), preferably about 1480 to 17339 kPa (200 to 2500 psig), liquid hourly space velocities from about 0.1 to about 10 hr.$^-$, preferably about 0.1 to about 5 hr$^{-1}$, and hydrogen treat gas rates from about 45 to about 1780 m$^3$/m$^3$ (250 to 10,000 scf/B), preferably about 89 to 890 m$^3$/m$^3$ (500 to 5000 scf/B).

Hydrocracking involves molecular weight reduction by cracking larger molecules into smaller ones. Hydrocracking typically involves a number of reactions such as cracking of large molecules, hydrogenation of olefinic bonds, ring opening, heteroatom removal and hydrogenation of aromatics. Hydrocracking catalysts include a cracking component, a hydrogenation component and a binder or support. The cracking component may be amorphous or crystalline. Amorphous cracking catalysts include silica-aluminas. Crystalline cracking catalysts are molecular sieves including aluminosilicates such as zeolites and aluminophosphates such as SAPOs. Examples of zeolites as cracking catalysts include Y, USY, X, beta, ReY, mordenite, faujasite, ZSM-12 and other large pore zeolites. Examples of SAPOs include SAPO-11, SAPO-31, SAPO-41, MAPO-11 and ELAPO-31. Crystalline cracking catalysts have Constraint Indices less than about 2. Hydrogenation components include Group 6 or Group 8-10 metals or oxides or sulfides thereof, preferably one or more of molybdenum, tungsten, cobalt, or nickel, Ru, or the sulfides or oxides thereof. Examples of suitable refractory supports include refractory oxides such as alumina, silica-alumina, halogenated alumina, silica-magnesia, silica-zirconia, alumina-boria, silica-titania, silica-zirconia-titania, acid-treated clays, and the like. A preferred catalyst comprises (a) an amorphous, porous solid acid matrix, such as alumina, silica-alumina, silica-magnesia, silica-zirconia, silica-thoria, silica-beryllia, silica-titania, silica-alumina-rare earth and the like, and (b) a zeolite such as faujasite. The matrix can comprise ternary compositions, such as silica-alumina-thoria, silica-alumina-zirconia, magnesia and silica-magnesia-zirconia. Hydrocracking conditions include temperatures from about 204 to about 510° C., total pressures from about 790 to about 34576 kPa (100 to 5000 psig), space velocities from about 0.1 to about 10 hr$^{-1}$, and hydrogen treat gas rates from about 17.8 to about 1780 m$^3$/m$^3$ (100 to 10,000 scf/B).

Mild hydrocracking is directed to the production of lighter products such as mid distillates, light gas oils, and gasoline from heavy petroleum streams. Hydrocracking conditions are generally less severe than those of hydrocracking, especially as regards temperature and/or pressure and result in less conversion. The catalysts combine mild acidity with a hydrogenation function. The acidic function is provided for by amorphous supports such as silica-alumina, aluminas, halogenated aluminas, titania, zirconia, magnesia and combinations of silica-aluminas and other metal oxides, especially boron oxides. Hydrogenation function is provided by at least one of Group 6 and Groups 8-10 metals, especially Group 8-10 noble and non-noble metals, and are preferably combinations of Group 6 and Groups 8-10 metals. Preferred mild hydrocracking catalysts are low acidity silica-aluminas with a Group 9 or 10 metal, or combination of Group 9 or 10 metal with Group 6 metal. The amorphous support can be replaced with a zeolite, especially zeolite Y. Mild hydrocracking conditions include temperatures from about 230 to about 480° C., pressures from about 790 to about 20786 kPa (100 to 3000 psig), space velocities from about 0.1 to about 10 $hr^{-1}$, and hydrogen treat gas rates of about 89 to 445 $m^3/m^3$ (500 to 2500 scf/B).

Reduction of organic compounds containing functional groups usually involves compounds containing 0, S and N as heteroatoms. Preferred organic compounds are those containing a carbonyl group such as ketones, aldehydes, amides, esters and carboxylic acids. The catalysts for reducing organic carbonyl compounds are those containing metals from Groups 4-14. Examples of metals include Fe, Ni, Pd, Pt, Co, Sn, Rh, Re, Ir, Os, Au, Ru, Zr, Ag and Cu. The catalyst can additionally comprise a support such as for example a porous carbon support, a metallic support, a metallic oxide support or mixtures thereof. Such reductions may take place in an inert solvent. Temperatures and hydrogen pressures may vary according to the starting material, catalyst, reaction time and the like.

Aspects of the invention are illustrated by the following examples.

EXAMPLES

Example 1

Figure 1:
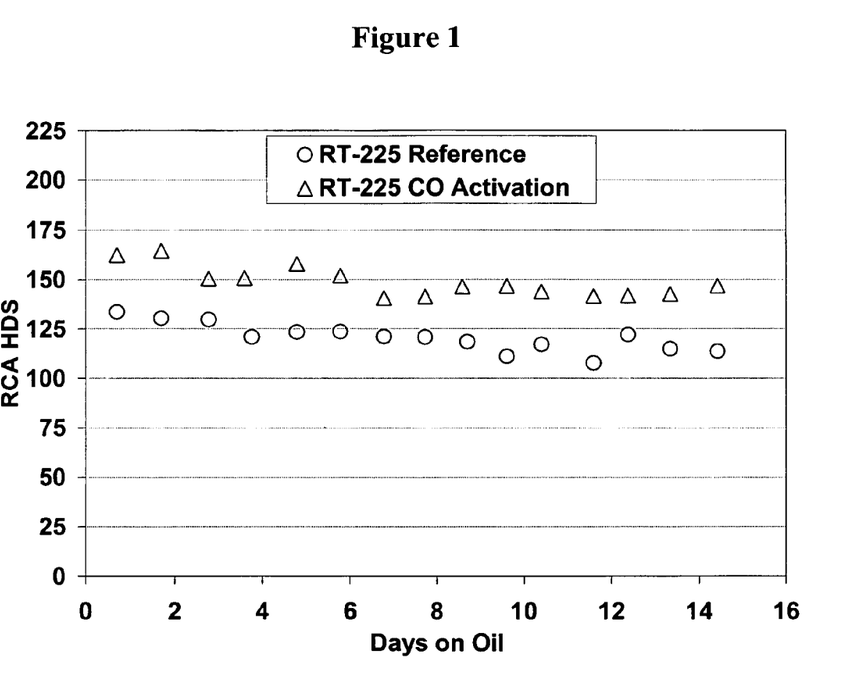
FIG. 1 is a graph showing relative catalyst activity for hydrodesulfurization using a reference catalyst vs. a CO activated catalyst.
Figure 2:
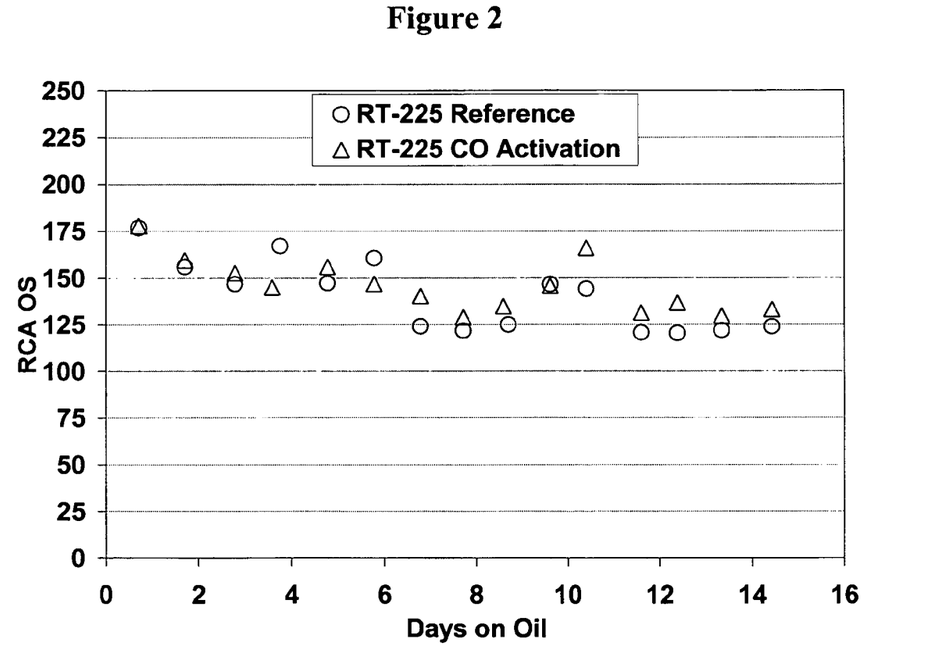
FIG. 2 is a graph showing relative catalyst activity for olefin saturation using a reference catalyst vs. a CO activated catalyst.

A commercially prepared sample of RT-225 (commercially available from Albermarle was used for this test. RT-225 was tested in a 1.3 mm asymmetric quadralobe form and is a CoMo on alumina catalyst with approximately 4.5 wt. % $MoO_3$ and 1.2 wt. % CoO. Two naphtha pilot units were used for this test. Reactor 1 and Reactor 2 were used to test the effect of sulfiding with 10 vol % hydrogen sulfide, 1000 vppm carbon monoxide and the balance hydrogen. Reactor 2 was used as a reference run using 10 vol. % hydrogen sulfide and 90 vol. % hydrogen during the sulfiding procedure. Both pilot units were loaded with 40 cubic centimeters of RT-225 and both used an intermediate cat naphtha (ICN) during the sulfiding procedure. Catalyst sulfiding was performed in-situ using the gas blends given above. The sulfiding was carried out for approximately 12 hours at holding temperatures of 204° C. and 343° C. with a reactor pressure of 305 psig. After sulfiding, the reactors were cooled to 274° C. and catalyst performance measured at 274° C., 240 psig inlet pressure, 356 $m^3/m^3$ (2000 scf/b) 100% hydrogen, and 4.0 liquid hourly space velocity for approximately 14 days. FIGS. 1 and 2 show the relative catalyst activity (RCA) for hydrodesulfurization (HDS) and for bromine number reduction or olefin saturation (HDBr). As can be seen from the FIG. 1, the RT-225 sample that was sulfided with $H_2S$—$H_2$ and CO resulted in a higher HDS activity of approximately 25%. FIG. 2 gives olefin saturation activity (HDBr). Very little difference in HDBr activity is seen between the RT-225 catalyst sulfided with $H_2S$—$H_2$ and CO versus the RT-225 sulfided with $H_2S$—$H_2$ only.

Example 2

Figure 3:
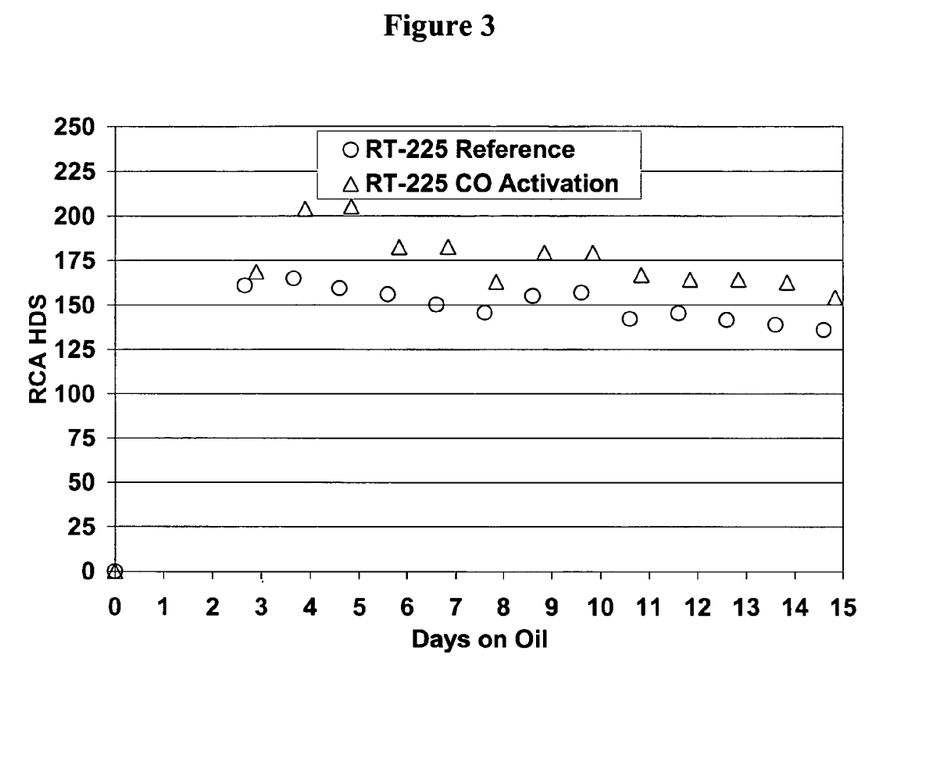
FIG. 3 is a graph showing relative catalyst activity for hydrodesulfurization using a reference catalyst vs. a CO activated catalyst using alternative activation conditions.
Figure 4:
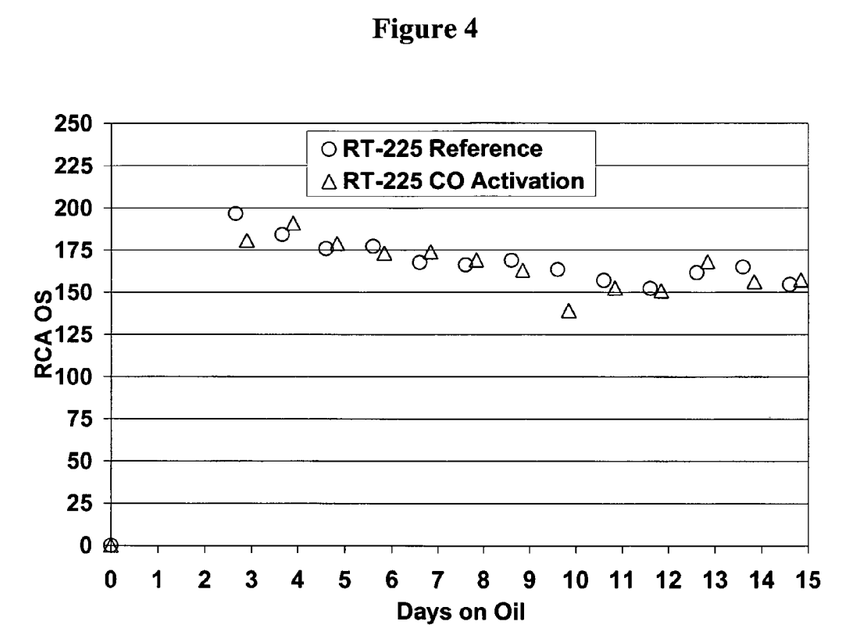
FIG. 4 is a graph showing relative catalyst activity for olefin saturation using a reference catalyst vs. a CO activated catalyst using the activation conditions of FIG. 3.

Commercially prepared samples of RT-225 were used for this test. RT-225 was tested in a 1.3 mm ASQ form and is a CoMo on alumina catalyst with approximately 4.5 wt. % $MoO_3$ and 1.2 wt. % CoO. Three naphtha pilot units were used for this test. Reactor B was used to test the effect of sulfiding with 10 vol. % hydrogen sulfide, 1000 vppm carbon monoxide and the balance hydrogen with intermediate cat naphtha. Reactor C was used as a reference run using 10 vol. % hydrogen sulfide and 90 vol. % hydrogen during the sulfiding procedure with intermediate cat naphtha (ICN). Reactor D was used as a second reference run using 10 vol. % hydrogen sulfide and 90 vol. % hydrogen during the sulfiding procedure with a light virgin naphtha (LVN). The three pilot units were loaded with 40 cubic centimeters of RT-225. Catalyst sulfiding was performed in-situ using the gas blends given above. The sulfiding was carried out for approximately 12 hours at holding temperatures of 204° C. and 343° C. with a reactor pressure of 305 psig. After sulfiding, the reactors were cooled to 274° C. for the two units using ICN and to 93° C. for the unit using LVN before measuring catalyst performance at 274° C., 240 psig inlet pressure, 356 $m^3/m^3$ (2000 scf/b) 100% hydrogen, and 4.0 liquid hourly space velocity for approximately 14 days with ICN. FIGS. 3 and 4 show the relative catalyst activity (RCA) for hydrodesulfurization (HDS) and for bromine number reduction or olefin saturation (HDBr). As can be seen from the FIG. 3, the RT-225 sample that was sulfided with $H_2S$—$H_2$ and CO resulted in a higher HDS activity of approximately 15-20%. Both RT-225 catalysts that were sulfided with only $H_2S$—$H_2$ showed near identical HDS activity. The effect of sulfiding with ICN versus LVN was very small to none. FIG. 4 gives olefin saturation activity (HDBr). Very little difference in HDBr activity is seen between the RT-225 catalyst sulfided with $H_2S$—$H_2$—CO versus the two RT-225 samples sulfided with $H_2S$—$H_2$ only.

Example 3

Figure 5:
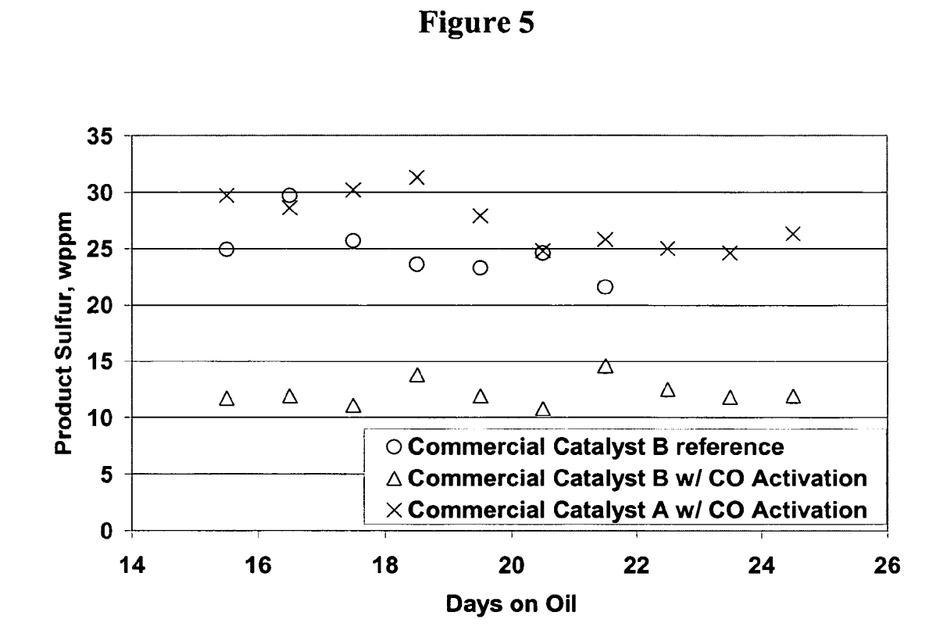
FIG. 5 is a graph showing product sulfur resulting from a hydrodesulfurization process that uses a reference catalyst vs. catalysts that have been activated in accordance with the invention.
Figure 6:
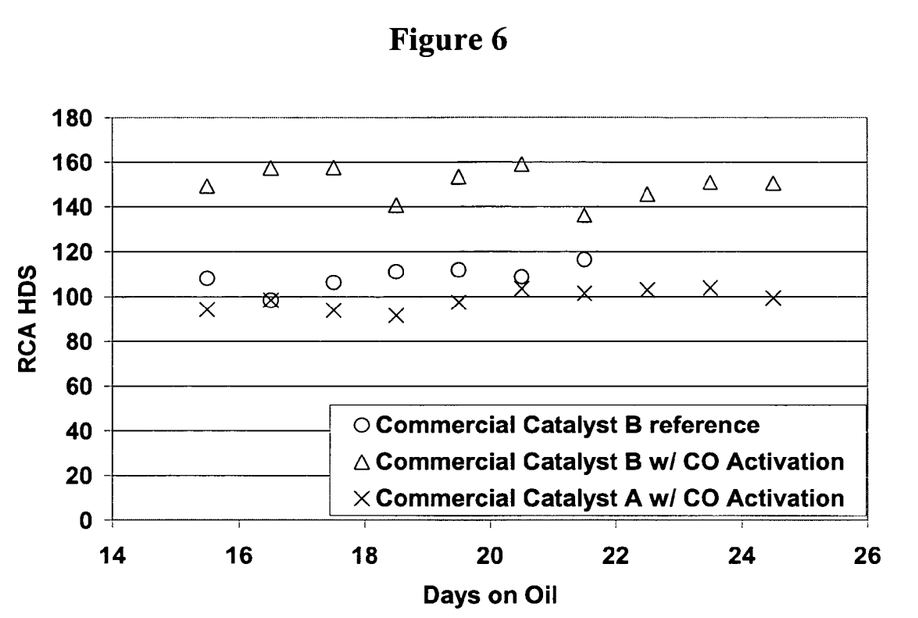
FIG. 6 is a graph showing relative catalyst activity using a reference catalyst vs. catalysts that have been activated in accordance with the invention.

Commercially prepared samples of Catalyst A and Catalyst B were used for this test. Catalyst A is a commercially available Co/Mo catalyst and Catalyst B is a second commercially available Co/Mo catalyst. Catalysts were tested as 1.3-1.5 mm extrudates and are both Co/Mo on alumina catalysts. Diesel pilot units were used for this test. A liquid phase sulfiding procedure was used. For sulfiding, a mixture of 1.5 wt. % dimethyl disulfide (DMDS) in light gas oil (LGO) was used. The DMDS-spiked feed was introduced at 66° C. and 1 LHSV for 6 hours. A gas blend of 1000 vppm CO in $H_2$ was introduced at the end of the 6 hour period. Pressure was set to 175 psig and temperature was increased to 232° C. and held there for 18 hours. Temperature was then increased to 321° C. for 12 hours. At the conclusion of the sulfiding, the treat gas was switched to 100% $H_2$ and unspiked LGO was introduced with conditions set at 329° C., 210 psig, 0.5 LHSV and 178 $m^3/m^3$ (1000 scf/B) treat gas rate (TGR). Catalyst performance was measured for Catalyst A (train 1) and Catalyst B (train 2). The catalysts in this run that were sulfided with CO were compared to a previous identical run of Catalyst B and LGO that was sulfided without CO present. FIGS. 5 and 6 show the product sulfur and 1.5 order K(HDS) for the two catalysts sulfided with CO compared to the standard activity test. The Catalyst B sample sulfided with CO showed 35% higher K(HDS) than the reference sample. The Catalyst A sample sulfided with CO was >80% as active as reference Catalyst B when the expected performance is only 60-70% of Catalyst B at these conditions. The increased activity of Catalyst A is important as the catalyst cost is much lower for this older generation catalyst.

The invention claimed is:

1. A hydroprocessing process which comprises: contacting a hydrocarbon feedstock with a hydroprocessing catalyst under hydroprocessing conditions wherein said hydroprocessing catalyst is a metal-containing hydroprocessing catalyst that has been activated by (a) treating an already metal-laden regenerated metal-containing hydroprocessing catalyst with a carbon monoxide precursor, and (b) contacting carbon monoxide precursor treated catalyst from step (a) with hydrogen and a sulfiding agent under catalyst activation conditions, such that the carbon monoxide precursor generates carbon monoxide, thus activating the regenerated catalyst from step (a).

2. The process of claim 1 wherein the hydroprocessing catalyst has been presulfurized such that hydrogen sulfide is generated during catalyst sulfiding.

3. The process of claim 1 further comprising a step of presulfurizing by a presulfurizing agent including sulfur, sulfides including polysulfides, mercaptans, thiocarboxylic acids and esters thereof.

4. The process of claim 1 wherein the catalyst activation conditions involve treating the catalyst containing metal with CO at CO concentrations of from about 10 to 100,000 wppm in the presence of hydrogen plus hydrogen sulfide at concentrations from about 10 to about 99.999 vol. %, based on total volume of gases present, provided that hydrogen sulfide is present in an amount sufficient to convert metal oxide, metal salt or metal complex to the corresponding sulfide form, total pressure in the range up to about 34576 kPa (up to 5000 psig), liquid hourly space velocities (LHSV) from about 0.1 to about 10 $hr^{-1}$ provided that liquid carrier is present, temperatures from about 149 to about 427° C. (300 to 800° F.), and total gas rates from about 0.178 to 17800 $m^3/m^3$ (1 to 100,000 scf/B catalyst).

5. The process of claim 1 wherein the metal is in the form of metal oxide, metal salt or metal complex.

6. The process of claim 5 wherein the metals used in hydroprocessing catalysts are from Groups 3-10 of the Periodic Table.

7. The process of claim 6 wherein the metals used in hydroprocessing catalysts consist essentially of metals from Groups 6 and 8-10 of the Periodic Table.

8. The process of claim 7 wherein the metals are at least one of Mo, W, Ni, Co, and Ru, and wherein the hydrocarbon feedstock is selected from $C_5$+ paraffins, naphthas, kerosene, gasoline, heating oils, jet fuels, diesel, cycle oils, catalytically cracked light and heavy gas oils, hydrotreated gas oil, light flash distillate, vacuum gas oil, light gas oil, straight run gas oil, coker gas oil, synthetic gas oil, deasphalted oils, foots oil, slack waxes, waxes obtained from a Fischer-Tropsch synthesis process, long and short residues, and syncrudes, optionally originating from tar sands, shale oils, residue upgrading processes, biomass, and organic compounds containing functional groups that can be reduced.

9. The process of claim 1 wherein the CO treatment may be initiated before introduction of the sulfiding agent, at the same time as the sulfiding agent or after partial sulfiding.

10. The process of claim 1 wherein CO generating precursors include carbon dioxide, carboxylic acids, carbonates, formaldehyde, glyoxal, and carbonyls.

11. The process of claim 1 wherein treatment of catalyst with CO precursor takes place in the absence of a selective deactivating agent.

12. The process of claim 1 wherein hydroprocessing includes hydrogenation, hydrotreating, hydrodesulfurization, hydrodenitrogenation, hydrodemetallization, hydrofinishing, hydrodearomatization, hydroisomerization, hydrodewaxing, hydrocracking, hydrocracking under mild pressure conditions, and reduction of organic compounds containing functional groups.

13. The process of claim 12 wherein the hydroprocessing process is hydrotreating under hydrotreating conditions.

14. The process of claim 13 wherein hydrotreating includes hydrodesulfurization, hydrodenitrogenation and hydrodearomatization.

15. The process of claim 14 wherein hydrotreating process conditions include temperatures from about 120° C. to about 500° C. (248 to 1000° F.), pressures from about 446 to about 27681 kPa (50 to 4000 psig), hydrogen treat gas rate from about 17.8 to about 1780 $m^3/m^3$ (100 to 10,000 scf/B), and a liquid hourly space velocity of from about 0.1 to 10 $hr^{-1}$.

16. The process of claim 14 wherein hydrotreating catalysts contain Co, Mo, Ni, W, and mixtures thereof, or bulk metals of at least one Group 8-10 non-noble metal and at least two Group 6 metals wherein the ratio of Group 6 metal to Group 8-10 non-noble metal is from about 10:1 to about 1:10.

17. The process of claim 12 wherein the hydroprocessing process is hydrodewaxing under hydrodewaxing conditions.

18. The process of claim 17 wherein hydrodewaxing includes a dewaxing catalyst that may be either crystalline or amorphous.

19. The process of claim 18 wherein crystalline materials are zeolites containing at least one 10 or 12-ring channel or may be aluminophosphates.

20. The process of claim 17 wherein dewaxing catalysts contain a metal hydrogenation component, which is at least one Group 6 metal, at least one Group 8-10 metal, or mixtures thereof.

21. The process of claim 17 wherein hydrodewaxing conditions include temperatures from about 200 to about 500° C., pressures from about 790 to about 20786 kPa (100 to 3000 psig), liquid hourly space velocities from about 0.1 to about 10 $hr^{-1}$, and hydrogen treat gas rates from about 45 to 1780 $m^3/m^3$ (250 to 10,000 scf/B).

22. The process of claim 12 wherein the hydroprocessing process is hydrofinishing under hydrofinishing conditions.

23. The process of claim 22 wherein the hydrofinishing catalyst contains Group 6 metals, Groups 8-10 metals, and mixtures thereof.

24. The process of claim 23 wherein the hydrofinishing catalyst includes at least one metal sulfide having a strong hydrogenation function and may also include bulk metal catalysts wherein the amount of metal is about 30 wt. % or greater based on catalyst.

25. The process of claim 22 wherein hydrofinishing conditions include temperatures from about 150 to about 350° C., total pressures from about 2859 to about 20786 kPa (400 to 3000 psig), liquid hourly space velocity from about 0.1 to about 5 LHSV ($hr^{-1}$), and hydrogen treat gas rates from about 44.5 to about 1780 $m^3/m^3$ (250 to 10,000 scf/B).

26. The process of claim 12 wherein the hydroprocessing process is hydrocracking under hydrocracking conditions.

27. The process of claim 26 wherein the hydrocracking catalyst is an amorphous catalyst or a crystalline catalyst including zeolites Y, USY, X, beta, ReY, mordenite, faujasite, ZSM-12 and other large pore zeolites, or SAPOs including SAPO-11, SAPO-31, SAPO-41, MAPO-11 and ELAPO-31.

28. The process of claim 27 wherein the hydrocracking catalyst contains hydrogenation components including Group 6 or Group 8-10 metals or oxides or sulfides thereof.

29. The process of claim 26 wherein hydrocracking conditions include temperatures from about 204 to about 510° C., total pressures from about 790 to about 34576 kPa (100 to 5000 psig), space velocities of from about 0.1 to about 10 $hr^{-1}$, and hydrogen treat gas rates from about 17.8 to about 1780 $m^3/m^3$ (100 to 10000 scf/B).

30. The process of claim 12 wherein the hydroprocessing process is reduction of organic compounds containing functional groups.

31. The process of claim 30 wherein the functional group is a carbonyl.

32. The process of claim 31 wherein the organic compound containing carbonyl group is a ketone, aldehyde, ester, amide or carboxylic acid.

33. The process of claim 1 wherein hydroprocessing conditions include temperatures from about 120 to about 538° C., pressures from about 446 to about 34576 kPa (50 to 5000 psig), liquid hourly space velocities from about 0.1 to about 20 $hr^{-1}$, and hydrogen treat gas rates from about 17.8 to about 1780 $m^3/m^3$ (100 to 10,000 scf/B).

* * * * *